R. JOHNSON.
GAGE STAKE FOR CHECK ROW WIRES.
APPLICATION FILED APR. 27, 1918.
1,279,348. Patented Sept. 17, 1918.
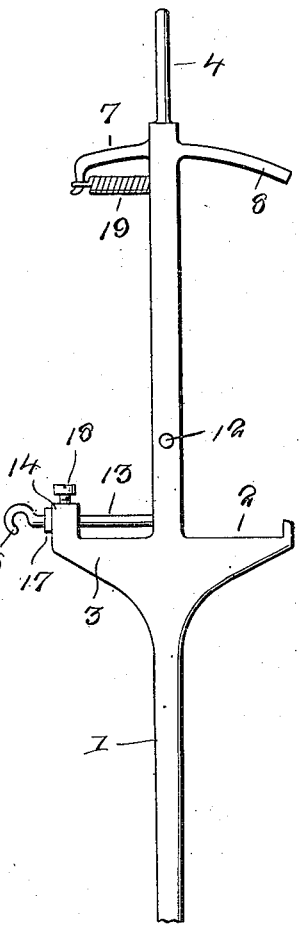
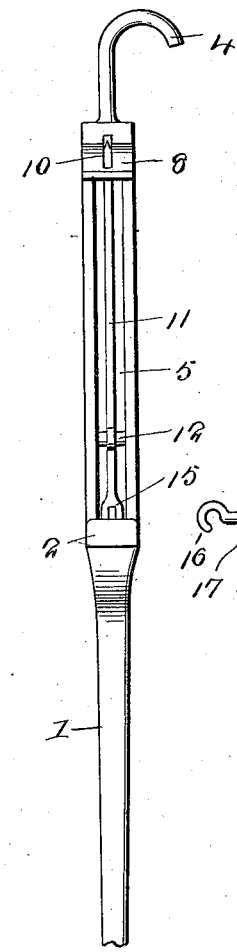
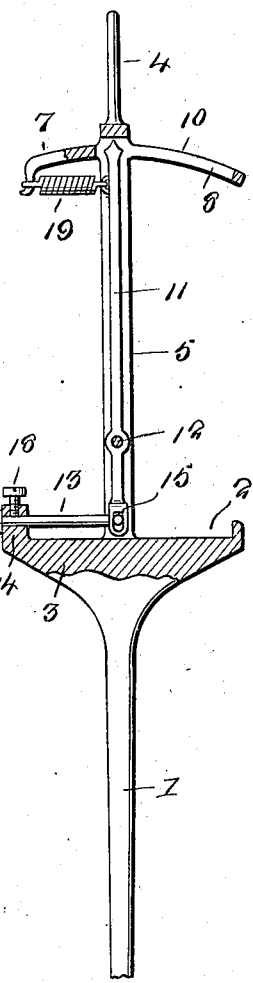
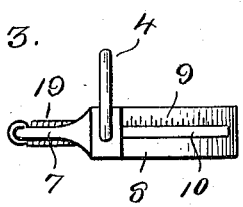
Inventor
R. Johnson
By Victor J. Evans
Attorney

UNITED STATES PATENT OFFICE.

RICHARD JOHNSON, OF LAKE BENTON, MINNESOTA.

GAGE-STAKE FOR CHECK-ROW WIRES.

1,279,348.  Specification of Letters Patent.  Patented Sept. 17, 1918.

Application filed April 27, 1918. Serial No. 231,143.

*To all whom it may concern:*

Be it known that I, RICHARD JOHNSON, a citizen of the United States, residing at Lake Benton, in the county of Lincoln and State of Minnesota, have invented new and useful Improvements in Gage-Stakes for Check-Row Wires, of which the following is a specification.

This invention is an improved gage stake for the attachment of a wire thereto such as is used in connection with a check row corn planting machine, to stretch the wire across the field and to also indicate the tension on the wire and thereby enable the wire to be stretched to the desired degree, the object of the invention being to provide an improved device of this character which is simple in construction, which can be readily operated, and which is efficient in use.

With the above and other objects in view, the invention consists in the construction, combination and arrangement of devices hereinafter described and claimed.

In the accompanying drawing:—

Figure 1 is an elevation, partly in section, of a check row wire stake constructed and arranged in accordance with my invention.

Fig. 2 is a similar view at right angles to Fig. 1.

Fig. 3 is a plan of the same.

Fig. 4 is a vertical central sectional view of the same.

The stake 1, which is adapted to be driven into the ground at one side of a corn field and in line with a projected row is provided at a suitable distance from its upper end with a foot rest 2 which projects from one side thereof and with an arm 3 which projects from the opposite side thereof. A handle 4 is formed at the upper end of the stake and that portion of the stake which is between the handle and the foot rest is provided with a vertical slot 5 of suitable width. A bracket 6 projects from the upper end of the stake on the same side as the arm 3 and terminates in a hook 7. An arcuate gage arm 8 projects from the opposite side of the upper end of the stake and is inscribed on its upper side with a suitable numbered scale 9 and the said gage arm is also provided with a longitudinal slot 10.

A lever 11, which is also a pointer, is fulcrumed as at 12 in the sides of the slot 5, said pointer lever being arranged in said slot and its upper end being arranged to move in the slot 10 of the gage arm. A rod 13 is slidably mounted in a guide 14 with which the arm 3 is provided and the inner end of said rod is pivotally connected to the bifurcated lower end 15 of the pointer lever. At its outer end the said rod is provided with a hook 16 to enable a check wire to be attached to said rod. A stop 17 is secured on said rod, near the hook, and coacts with the guide to limit the movement of the rod and hence also of the pointer lever in one direction, the said stop being in engagement with the guide when the pointer lever is in vertical position and at the zero mark on the gage arm. I also provide a thumb screw 18 which is arranged in a threaded opening in the guide and which may be screwed against the rod to lock the latter against endwise movement. A coiled retractile spring 19 of suitable strength has one end attached to the hook 7 of the bracket 6 and the other end attached to the pointer lever at a point near the free upper end of said lever.

When stretching the wire the stake is held in the hands and the thumb screw 19 having been previously loosened the pointed lever coacts with the spring 19 and the gage arm to indicate the degree of tension on the wire. While keeping the wire under such tension the stake is then forced downwardly into the ground by the foot and the thumb screw is then tightened to hold the rod and hence also the pointer lever against further movement.

While I have herein shown and described a preferred embodiment of my invention, I would have it understood that changes may be made in the form, proportion and construction of the several parts, without departing from the spirit of my invention, and within the scope of the appended claim.

Having thus described the invention, what is claimed as new is:—

A stake of the class described, having a gage arm, a pointer lever to coact with the gage arm, a spring to turn the lever in one direction, an attaching rod connected to the lever and serving for the attachment of a check wire, a guide for said rod, a stop on said rod to coact with said guide to limit the movement of the lever under the tension of the spring and means to lock said rod against movement.

In testimony whereof I affix my signature.

RICHARD JOHNSON.

Copies of this patent may be obtained for five cents each, by addressing the "Commissioner of Patents, Washington, D. C."